United States Patent [19]

Thöni

[11] 4,449,790
[45] May 22, 1984

[54] ELECTROCHROMIC LAYER SYSTEM

[75] Inventor: Werner Thöni, Maienfeld, Switzerland

[73] Assignee: Balzers Aktiengesellschaft, Liechtenstein

[21] Appl. No.: 276,490

[22] Filed: Jun. 23, 1981

[30] Foreign Application Priority Data

Jul. 7, 1980 [CH] Switzerland ............... 5183/80

[51] Int. Cl.³ ............................................... G02F 1/17
[52] U.S. Cl. ............................................... 350/357
[58] Field of Search .................................... 350/357

[56] References Cited

U.S. PATENT DOCUMENTS 3,829,196  8/1974  Deb .................................. 350/357
4,146,309  3/1979  Singh et al. ...................... 350/357

Primary Examiner—James W. Davie
Attorney, Agent, or Firm—McGlew & Tuttle

[57] ABSTRACT

An electrochromic coat system comprises first and second juxtaposed spaced apart transparent plates and first and second spaced apart transparent electrodes adjacent respective ones of said plates and spaced apart from each other including a plurality of electrochromic coats between the electrodes and a polyvalent metal having free atoms embedded between one of the electrochromic coats and the electrodes. The coats include at least one coat of an electrochromic metal and at least one additional transparent coat of a matrix of solid inorganic substance which comprises an electrolyte carrier. An electrochromic metal comprises, for example, $WO_3$. One additional coat acts as a matrix of solid inorganic substance ($SiO_2$ or $ZrO_2$) which acts as a carrier of an electrolyte which is arranged between the two electrodes. One of the two electrodes is transparent. In the inventive arrangement with the embedded atoms 5 of a polyvalent metal disposed between one of the coats and the adjacent electrode insures that the coat system can be operated for long periods with the complete exclusion of moisture and air. Suitable for the embedded coat 4 are rhodium, nickel, chromium, titanium and molybdenum. The construction may be used for coatings with adjustable light absorption in eye glasses, rear view mirrors and displays.

12 Claims, 3 Drawing Figures

ELECTROCHROMIC LAYER SYSTEM

FIELD AND BACKGROUND OF THE INVENTION

The present invention relates in general to an electrochromic layer system, and in particular to a system where a layer or coat of an electrochromic material and at least one additional layer or coat having a matrix of a solid inorganic substance as the carrier of an electrolyte are arranged on a substrate between two electrodes, of which at least one is transparent.

Electrochromic layers are layers which change their absorption behavior under the action of an electric field, that is, their transmission color under the action of a field of a predetermined direction, or which return to their original state when the field disappears or is reversed. This phenomenon is based on the appearance of new or on the displacement of existing absorption bands in the materials. Of particular importance are those (so-called "long-lasting") electrochromic materials where the state brought about by the electrical field (e.g. a blue coloration) remains after the field is disconnected and can only be removed when an opposing field is applied. These materials are particularly suitable for displays, since the maintenance of certain display state does not require a permanent electric field, only corresponding voltage pulses are required to change the display.

The electrochromic materials are generally insulating or semi-conductive materials. The long-lasting electrochromic materials are mostly inorganic materials which contain polyvalent chemical elements which can form several oxidation states. Suitable are, e.g. the metallic transition metals, like copper. As electrochromic coating materials which can contain the said elements in several oxidation states are used, e.g. oxides, selenides, tellurides, chromates, molybdates, tungstenates and similar compounds. Particularly tungsten oxide is widely used as an electrochromic layer material, which passes over by an electric field from a state that appears colorless absorption free in the visible spectral range into a state in which it appears blue in transmitted light produced by a wide absorption band with a maximum at about 1.5 mu m. The thickness of electrochromic layers is preferably between 0.1 and 10 mu m, and even low voltages of a few Volt suffice already to produce a high field strength in the layer by means of applied electrodes.

In order to obtain a reversible electrochromic layer arrangement, it is necessary to apply an electrolytic layer between the electrodes in addition to an electrochromic layer, that is, a layer which changes in its optical transmission under the influence of an electric field. This electrolytic layer has the function, according to present thinking of injecting ions into the electrochromic layer with a corresponding field direction. Possible ion-sources are particularly strong acids, (e.g. sulfuric acid) and bases, but also plastics, which either contain themselves acid or basic groups, or which act as carriers of electrolytes with which they are impregnated. Frequently gels and pastes containing an electrolyte are also used in known arrangements.

The strong electrolytes have the great disadvantage that they are mostly aggressive and corrode the electrochromic metal and frequently also the electrodes, so that the useful life of these arrangements is considerably reduced. In order to eliminate this disadvantage as far as possible, it has been suggested to provide protective coats, e.g. of silicon oxide, calcium fluoride, magnesium fluoride, or similar insulating materials which can be arranged either only between the electrolytic layer and the electrochromic layer, or on both sides of the electrolyte. This also solved the problem of a good contact between the electrolytic layer and an adjacent transparent electrode, e.g. a gold electrode. With sufficient thickness of the protective coat it can thus be achieved that the electrically insulates the electrode, which seems necessary for the operation of the electrochromic device, but remains at the same time sufficiently permeable to ions. For silicon oxide as a protective coat is recommended, for example, a thickness of 3.4–4.5 mu m. In order to further increase the adhesion of gold electrodes on the protective coat, it has been suggested to provide so-called nucleation coats in the manufacture between the said two coats particularly of palladium, because it is known that such a germination of a substrate, before the following metal coat is applied, can greatly increase the bond between the two coats.

In order to avoid the difficulties encountered with strong acids or bases as electrolytes, as well as with the use of semi-liquid or pasty electrolytic layers or, inorganic layers have already been used for the electrolytic layers, where water molecules originating from the humidity of the air could accumulate on their surface or pores, so that obviously a sufficient amount of ions was formed, probably due to the foreign substances dissolved in the water. Preferably oxides and fluorides were used for the electrolytic layers. But this raised another problem: the layer systems had to remain open to the atmosphere, so that they could absorb water vapors from the environment, perhaps also carbon dioxide, ammonia and gases which contributed to the ion-formation. A disadvantage of these open systems was the great dependence of their functioning on the respective atmospheric conditions. When it was tried to seal the systems from the outside air, they soon failed, e.g. after 1000 switching cycles, while a life of at least $10^6$ switching cycles would be desirable. Obviously the water or other substances originating from the layer system, which are necessary for the electrolysis, are irreversibly used up in the operation of these electrochromic devices which is also suggested by the fact that the light absorbing products are frequently deposited in the course of time on the electrode adjoining the electrolytic layer, which is particularly annoying in the transparent electrode.

In order to suppress the formation of deposits, a film of oxidation reduction polymer, a filler polymer film or a layer in the form of a paste can be provided additionally between the electrolytic layer and the adjoining electrode according to DOS No. 28 54 812, which contains an oxidizing or reducing form of a substance. Particularly recommended for this purpose is a coat in the form of a filler-containing polymer film based on polyvinyl-alcohol with graphite powder as a filler, where the oxidized or reduced form of the substance forms a reversible oxidation-reduction electrode, where there is no storage of products of non-reversible electrochemical reactions. The object was to seal the system hermetically, but a disadvantage of this known arrangment, specifically for transparent systems, is that this additional coat (particularly when it contains graphite powder as a filler), is itself interfering by its light absorption.

SUMMARY OF THE INVENTION

The present invention provides a new electrochromic layer system with a long service life, which permits a hermetic seal from the atmosphere and substantially prevents the deposit of annoying products on the electrodes.

In accordance with the invention an electrochromatic layer system comprises first and second spaced apart electrodes at least one of which is transparent and a plurality of layers between the electrodes which includes at least one layer of an electrochromic material and at least one additional transparent layer of a matrix of solid inorganic substance comprising an electrolyte. The complete coating includes free polyvalent metal atoms embedded between the electrolyte layer and the adjacent electrode.

The invention permits the use of known air-tight transparent electrodes which make a high electrical conductivity of the electrode possible (resistivity lower than 100 ohm per square) with a transmission of over 80%. Heretofore practically only pure gold electrodes could be used for electrochromic systems to obtain a sufficient electrical conductivity with adequate transmission, because only gold electrodes were permeable both to air and moisture, as required in open systems. But even with gold electrodes, only a transmission of at most 70% could be achieved for a resistivity of 20 ohm per square, for example, and these electrodes were moreover mechanically highly sensitive and did not protect the system enough against corrosion by atmospheric influences, especially because it has to be open to the atmosphere. A somewhat greater mechanical resistance could be achieved under certain circumstances with other metals which have already been suggested for transparent electrodes (e.g. tin, aluminum) but the ratio of transmission to electrical conductivity was unsatisfactory, or the electrodes were not permeable enough to air and moisture to ensure the operation of the electrochromic system for a long period of time. The invention, however, permits the use of the best electrode materials available at present for transparent electrodes which are also mechanically resistant and seal the system hermetically, so that the operation cannot be influenced or impaired by outside atmospheric influences.

The amount of polyvalent metal to be embedded according to the invention can be so small that additional light absorption, compared to absorption by the other layers (particularly the electrodes) of the system, cannot be detected at all or only with sensitive measuring methods. The total amount of polyvalent metal embedded according to the invention on the boundary surface between the electrode and the electrolytic layer need at any rate not be greater than corresponds to a layer thickness of 10 nm at most (if the metal were arranged as a compact and discrete layer between electrolyte and electrode). It can easily be achieved that the light absorption caused by the incorporation of metal according to the invention does not exceed 5%.

The incorporation can be in the form of a discrete layer or so that the embedded metal forms with an adjacent layer, e.g. with the electrode, a mixture or alloy at the boundary surface. The polyvalent metal can also form with the adjacent electrolytic layer, that is, with the carrier of the electrolyte, a finely dispersed mixture, for example, it can be embedded in the boundary surface toward the adjacent electrode in the silicon or zirconium oxide of the electrolytic layer.

Accordingly it is an object of the invention to provide an electrochromic layer system which makes it possible to operate for long periods of time with complete exclusion of moisture and air which includes embedded atoms of a polyvalent metal between electrolytic coats and adjacent electrodes.

A further object of the invention is to provide an electrochromatic layer system which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
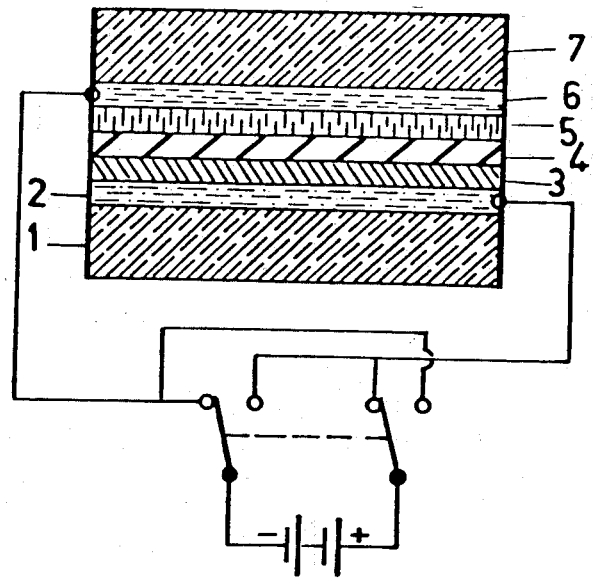
FIG. 1 is a sectional view of an arrangement according to the invention where the electrochromic layer system is enclosed between a carrier and a cover plate, where at least the top electrode (in the drawing) and the cover plate are transparent, and the embedded layer is arranged between the top electrode and the electrolytic layer.
Figure 2:
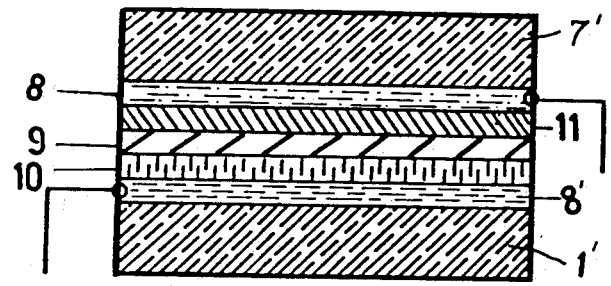
FIG. 2 is a view similar to FIG. 1 of a similar arrangement, with the order of the layers reversed, where the embedded layer bears on the electrode applied on the carrier plate (the bottom electrode in the drawing)
Figure 3:
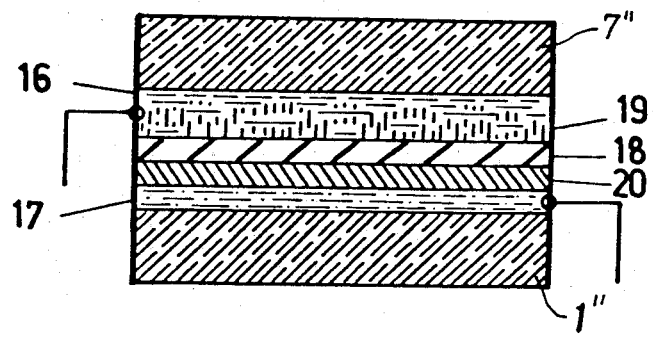
FIG. 3 is a view similar to FIG. 1 of an arrangement where the embedded layer forms a finely-dispersed mixture on the boundary surface with the adjacent electrode.

Referring to the drawings in particular, the invention embodied therein comprises in each of FIGS. 1, 2, 3 distinct electrochromic layer systems which in accordance with the invention comprises first and second juxtaposed transparent plates 1 and 7 in FIG. 1, 1' and 7' in FIG. 2 and 1" and 7" in FIG. 3.

It must be kept in mind that the represented layer thicknesses and the thicknesses of the carrier and cover plates are in no way true to scale (a scale drawing would not be possible because the embedded layer and the thickness zone respectively, inside which the metal atoms are distributed are much thinner than the thicknesses of the other layers, and the thicknesses of the latter are in turn by orders of magnitude smaller than the carrier and cover plate thicknesses

FIRST EXAMPLE

In order to obtain an electrochromic layer system (FIG. 1) a first transparent electrode 2 which consisted of indium-tin-oxide was applied in known manner on a glass plate 1. The resistivity of this electrode layer system was 20 ohm per square. As an electrochromic layer proper a $WO_3$-layer 3 of 500 nm thickness, was then applied. Then, as an electrolytic layer of the electrochromic system, a $ZrO_2$ layer 4 of 150 nm thickness was applied, which were both produced by vacuum vaporization. Finally a layer 5 of metallic nickel of 2 nm thickness was applied, and on top of it, as a second electrode, a transparent gold layer 6 of 10 nm thickness was applied. The above-described system was covered by a cover glass 7 and sealed hermetically from the outside air by means of a synthetic resin. The following operating data were obtained:

When a voltage difference of 2.5 V was applied to electrodes 2 and 6, where the electrode 2 adjoining the $WO_3$ layer 3 was negative, a blue coloration of the previously colorless system could be observed in about 25 seconds. At the wavelength lambda=550 nm, the transmission swing 100 times $(T_o-T)/T_o$ expressed in %, was 53%, where $T_o$ denotes the transmission in the uncolored state, and T the transmission in the blue state. If a voltage of 1.5 V of inverse polarity was applied, the color disappeared again in about 20 seconds, and the initial state was restored. In contrast to an otherwise identical system, but without the embedded layer 5 according to the invention, no decrease of the transmission swing was observed after 100 switching cycles, for example.

SECOND EXAMPLE

In this example, arrangement of the layers as in example 1, a titanium layer of 2 nm thickness was provided instead of nickel as a polyvalent metal between the electrolytic $ZrO_2$ layer 4 and the adjacent electrode 6, the other layers of the system were the same as in the first example. The voltage to obtain a coloration was again 2.5 V, the coloring time 20 seconds and the transmission swing 40%. With a voltage of 1.5 V of inversed polarity the system was decolored again in about 15 seconds.

THIRD EXAMPLE

In this layer system (FIG. 2), we selected chromium instead of nickel or titanium as a material for the embedded layer 10 of a polyvalent metal arranged between the electrolytic layer 9 and the adjacent bottom electrode 8'. Layer 11 consisted, as in the first example, of $WO_3$ and the electrode 8 of gold. With a coloring voltage of 2.5 V, we achieved maximum coloration within 12 seconds with a transmission swing of 53%; the decoloration could likewise be achieved within 12 seconds with 1.5 V.

FOURTH EXAMPLE

As a layer of a polyvalent metal in this case, a rhodium layer 10 of 1 nm thickness was provided. The other layers of the system were the same as in the preceding examples. The coloring time was 25 seconds, the transmission swing 50% and the bleaching time 20 seconds.

FIFTH EXAMPLE

For this example (FIG. 3) we used as transparent electrodes on both sides layers 16 and 17 of indium-tin-oxide (with a surface resistance of 20 ohm per square). As a polyvalent metal between one of the electrodes and the electrolytic layer 18 of zirconium oxide (15 nm) was used a molybdenum layer 19 of 2 nm thickness, which was so embedded that the transition from the pure electrode material to the pure embedded layer was produced, which is indicated in FIG. 3 by the absence of a clear boundary line between the two layers. The electrochromic layer 20 consisted again of $WO_3$ (500 nm). In this example too, the coloring time was 25 seconds, with a coloring voltage of 2.5 V, the swing was 50%, the bleaching voltage 1.5 V and the bleaching time 20 seconds.

Particularly effective polyvalent metals in the sense of the invention are rhodium, nickel, titanium chromium and molybdenum. As it can be seen from FIGS. 1 and 2, it is irrelevant whether the top or the bottom electrode is transparent and whether the embedded layer of polyvalent metal atoms adjoins a transparent or a non-transparent electrode. In connection with transparent electrodes, the invention is particularly effective because the reduction of the transparency which otherwise occurs after prolonged use, due to electrochemical deposition products, is substantially reduced; but even in connection with non-transparent electrodes, e.g. metallically reflecting electrodes, the invention has the advantage that the reflecting power of such an electrode is maintained. The latter can be of importance, for example, in rear view mirrors with variable reflecting power.

While specific embodiments of the invention have been shown and described in detail to illustrate the application of the principles of the invention, it will be understood that the invention may be embodied otherwise without departing from such principles.

What is claimed is:

1. An electrochromic layer system, comprising a pair of spaced apart electrodes, a layer of an electrochromic material between said electrodes, at least one additional layer having a matrix of solid inorganic substance acting as a carrier of an electrolyte arranged on said electrochromic material layer between said material layer and one of said electrodes, said at least one additional layer being transparent, and free atoms of a polyvalent metal embedded between said at least one additional layer and the one of said electrodes forming a finely dispersed mixture with the matrix of solid inorganic substance near the one of said electrodes.

2. An electrochromic layer system according to claim 1, wherein said free atoms are rhodium atoms.

3. An electrochromic layer system according to claim 1, wherein said free atoms comprise chromium atoms.

4. An electrochromic layer system according to claim 1, wherein said free atoms comprise nickel atoms.

5. An electrochromic layer system according to claim 1, wherein said free atoms are titanium atoms.

6. An electrochromic layer system according to claim 1, wherein said free atoms are molybdenum atoms.

7. An electrochromic layer system according to claim 1, wherein the polyvalent metal is embedded at the boundary surface between said substance and an adjacent electrode which is light reflecting.

8. An electrochromic layer system according to claim 1, wherein the amount of polyvalent metal is selected so that it corresponds to an equivalent layer thickness of not more than 10 nm.

9. An electrochromic layer system according to claim 1, wherein the amount of free atoms is so selected that the optical absorption of light impinging on the system is less than 10%.

10. An electrochromic layer system according to claim 1, including first and second transparent glass plates on the outerside of each of pair of electrodes.

11. An electrochromic layer system according to claim 1, wherein one of said electrode comprises a gold electrode and said electrochromic material comprises $WO_3$.

12. An electrochromic layer system according to claim 1, wherein said metal comprises metallic nickel, said electrolyte carrier substance comprising $ZrO_2$, said electrochromic material layer comprising $WO_3$, and one of said electrodes being transparent and comprising indium tin oxide.

* * * * *